United States Patent [19]

Pariani et al.

[11] Patent Number: 4,907,221
[45] Date of Patent: Mar. 6, 1990

[54] APPARATUS FOR ATTENUATING THE ECHO SIGNAL IN TELEPHONE FORK CIRCUITS FOR TELEPHONE CONFERENCE CALLS

[75] Inventors: Angelo Pariani, Arona; Francesco Natali, Bartolomeo, both of Italy

[73] Assignee: SGS-Thomson Microelectronics S.r.L., Catania, Italy

[21] Appl. No.: 192,377

[22] Filed: May 10, 1988

[51] Int. Cl.[4] .............................................. H04Q 11/04
[52] U.S. Cl. ...................................... 370/62; 379/202
[58] Field of Search ........................... 370/62, 32, 32.1; 379/202

[56] References Cited

U.S. PATENT DOCUMENTS 4,153,817  5/1979  D'Ortenzio ............................ 370/62
4,203,005  5/1980  Fukuda et al. ........................ 370/62

Primary Examiner—Robert L. Griffin
Assistant Examiner—Wellington Chin
Attorney, Agent, or Firm—Rosen, Dainow & Jacobs

[57] ABSTRACT

A method of attenuating the echo signal in so-called telephone fork converting circuits, adapted for telephone conferences with a plurality of participants, consists of switching and arranging sequentially on a serial line messages from each participant as coded in the PCM code, by means of a digital switching array, and of performing a sign reversal on the PCM codings of a number of messages equal to the approximation to the nearest number below the number of participants in the conference divided by two. In the instance of an odd number of participants, first and second conferences are set up by means of a conference actuator, each conference comprising a different combination of inverted-sign coded messages and remaining coded messages from the participants, with consequent cancellation of the echo components having opposite sign; subsequently, on the double-wire receiving line associated with the telephone fork of each participant, one of said conferences is transmitted as deprived of the message related to that participant including a number of inverted-sign messages equal to that of the remaining original messages.

2 Claims, 1 Drawing Sheet

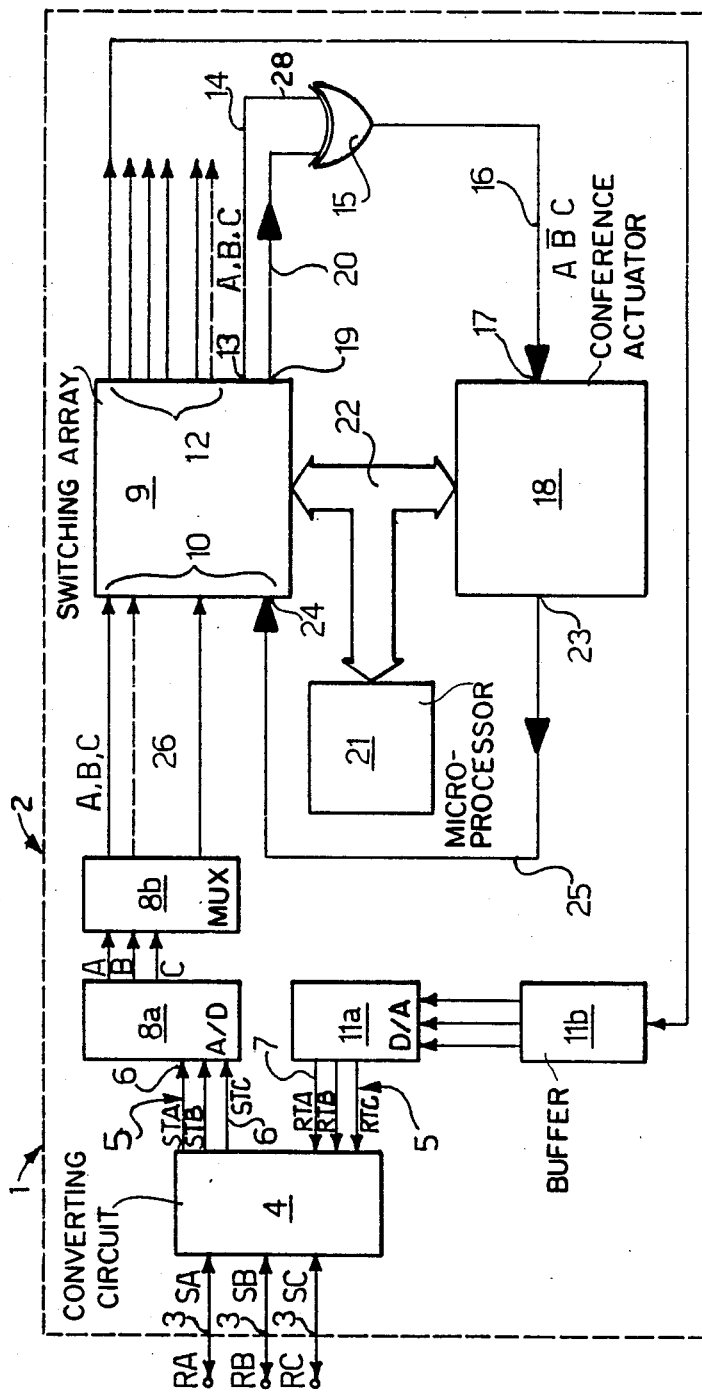
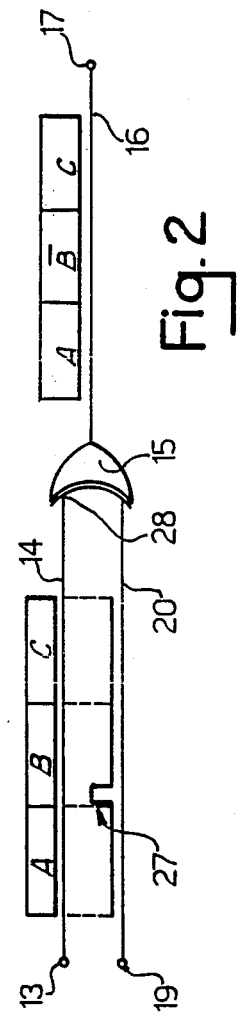
Fig. 1
Fig. 2

APPARATUS FOR ATTENUATING THE ECHO SIGNAL IN TELEPHONE FORK CIRCUITS FOR TELEPHONE CONFERENCE CALLS

BACKGROUND OF THE INVENTION

This invention relates to a method of attenuating the echo signal in converting circuits, referred to as telephone fork circuits, intended for telephone conferences held with an odd number of participants, said circuits being useful for matching double-wire telephone lines, each having analog phonic messages transmitted bidirectionally thereover to and from each of the participants, and pairs of double-wire lines, with each line in each pair being respectively adapted to receive and transmit said messages as converted each from and into a digital code of the PCM (Pulse Code Modulation) type.

The invention is also concerned with an apparatus operating in accordance with the above-noted method.

The field of application of the method and apparatus according to the invention comprehends in particular, though not solely, digital switching telephone exchanges and private telephone branch exchanges, also referred to as digital PABX (Private Automatic Branch Exchange), wherein there exists a demand for a conference switching phase between messages, coded according to the PCM digital code, from corresponding participants in the conference.

As is known, a telephone conference between a number of participants equipped with a corresponding subscriber telephone set is currently held, according to prior art approaches, with the intermediary of a pair of integrated electronic components consisting of a digital switching array cooperating with a conference actuator, both components being controlled by means of a microprocessor.

In particular a switching array, commercially available as SGS MO88, receives a number of channels each carrying a PCM-coded message, and performs switching between input and output channels.

Such input and output channels are concentrated on serial lines, each capable of being allocated up to thirty-two discrete channels by a conventional technique referred to as TDM (Time Division Multiplexing).

The second-mentioned of said component pair, commercially available as SGS M116, consists of a conference actuator which receives sequentially at its input, from a serial line, the PCM-coded messages supplied by the switching array, and performs arithmetic summing operations on the PCM coding of such messages, thus altering the value of the analog signal to which the coding applies.

Each of the participants in the conference, being equipped with a corresponding subscriber telephone set, is located at one end of a double-wire telephone line adapted for bidirectional transmission of analog phonic messages from and to each participant.

At the telephone exchange, the other end of the double-wire line is connected to a converting or interface circuit, referred to as telephone fork or "hybrid" circuit, which interfaces said line to a pair of discrete double-wire lines, respectively and separately operative to transmit and receive messages.

Message messages or signals designated ST and RT respectively are transmitted or received from and to a participant in the conference on a corresponding one of the aforesaid line pairs.

Further, the line intended for the transmitted signal ST is connected to an analog-to-digital converter whose output is multiplexed by the aforesaid TDM technique with the equivalent outputs of another thirty-one analog-to-digital converters on a single serial line, thus issuing a multiplexed digital signal which contains thirty-two PCM messages related to as many subscribers.

That serial line is applied to one of eight inputs to the switching array, which can therefore receive two hundred fifty-six discrete PCM messages. In a dual mode, the switching array has eight outputs, each having thirty-two PCM messages multiplexed thereon. Each of these outputs can be connected to a buffer which, using the same TDM technique, will read out the individual PCM messages and pass them to the inputs of thirty-two digital-to-analog converters whose outputs are applied to the respective RT signal receiving lines.

This prior approach has, however, a serious drawback in that on the transmission line there appears a signal component, referred to as echo, which is proportional to the receiving line signal.

In particular, on the transition from two to four wires through the telephone fork converting circuit, the transmitted signal ST is equal to the signal S transmitted on the double-wire line, connected directly to the participant in the conference, plus a signal component given by the product of the received signal RT multiplied by a parameter K. The value of this parameter K is variable and tied to the impedance Z of the double-wire telephone line interconnecting the participant in the conference and the converting circuit, as well as to the telephone signal frequency within the range of 300 to 3400 Hz.

The term KRT constitutes the aforesaid echo signal that affects and deteriorates the conversations of the participants in the conference.

SUMMARY OF THE INVENTION

The technical problem underlying this invention is to provide a method of attenuating said echo signal which affords improved quality of a conference held between plural participants through a telephone branch exchange.

This problem is solved by a method as indicated being characterized in that it comprises the steps of:
- arranging sequentially on a serial line the messages from each participant in PCM-coded form with the intermediary of a switching array;
- reversing the PCM code sign of a number of said messages equal to the approximation to the nearest number below the number of the participants in the conference divided by two;
- carrying out at least first and second conferences, each by adding said inverted sign messages to the remaining original messages of said participants, with cancellation of the echo components of opposite sign; and
- sending, on the receiving line of each participant, that one of said conferences which, when deprived of the message related to said participant, comprises a number of inverted sign messages which is the equal of the number of the remaining original messages.

This problem is also solved by an apparatus for attenuating the echo signal in so-called telephone fork converting or interface circuits, particularly for telephone conferences between plural participants, of a type which comprises:

a digital switching array having a plurality of inputs, with each input adapted to receive the PCM (Pulse Code Modulation) coding of a plurality of analog phonic messages transmitted from said participants;

a conference actuator operative to add codings of said messages and having a serial input arranged to receive said codings sequentially;

a logic gate of the exclusive-OR type having an input connected to a serial output from said array via a serial line, and the output connected to said serial input of said actuator, as well as a second input arranged to receive, from a second output from said array, a sign reversing signal for the coding of at least one of said messages;

a microprocessor connected to said switching array and said conference actuator to string out, on said serial line, an appropriate sequence of said messages and to generate said inverting signal; and a second serial line connected to the output of said actuator and an input of said switching array for switching to one in the plurality of outputs from said array the sums of the codings of said messages plus the inverted sign messages.

BRIEF DESCRIPTION OF THE DRAWINGS

The features and advantages of the method according to the invention will become apparent from the following detailed description of an apparatus for implementing it, to be taken by way of illustration and not of limitation in conjunction with the accompanying drawings.

In the drawings:

FIG. 1 is a schematic view of a telephone branch exchange incorporating the apparatus of this invention; and FIG. 2 is a schematic detail view of a portion of the apparatus shown in FIG. 1.

DESCRIPTION OF THE PREFERRED EMBODIMENTS

With reference to the drawing views, the numeral 1 designates comprehensively and schematically an apparatus for implementing the inventive method. The apparatus 1 is incorporated to a digital telephone branch exchange 2, e.g. of the PABX (Private Automatic Branch Exchange) type, to which a plurality of double-wire telephone lines, collectively indicated at 3, are led whose other ends are each connected to a subscriber telephone set, not shown, for a participant in a telephone conference.

The branch exchange 2 includes a converting or interface circuit 4, e.g. of the type available commercially as a SLIC (Subscriber Line Interface Circuit), which is adapted to provide a matching interface between each double-wire telephone line 3 and two groups 5 of double-wire lines 6, 7. Whilst the telephone line 3 is intended for bidirectional transmission of a message or analog phonic signal from and to said participant in the conference, each of the double-wire lines 6 intended is intended, to transmit a message or analog phonic signal and each of the double-wire lines 7 is intended to receive a message or analog phonic signal.

The message transmitted on the line 6 is denoted ST, and the message received on the line 7 is denoted RT.

At the ends of the transmission lines 6, there are analog-to-digital converters 8a, each having its output multiplexed via a multiplexer 8b to a line 26 connected to an input of a digital switching array 9 having a plurality of inputs indicated at 10.

Further, said receiving lines 7 are connected to the outputs of digital-to-analog converters 11a, each having inputs connected to the outputs of a buffer 11b connected on its input side to a plurality of outputs, denoted 12, from said switching array 9.

The analog-to-digital and digital-to-analog converters 8a and 11a, respectively, are operative to convert the analog phonic signal to and from a digital coding commonly referred to as PCM (Pulse Code Modulation).

The switching array 9 further comprises, among the outputs 12, a first serial output 13 to which one end of a serial line 14 is connected which has the other end connected to an input of a logic gate 15 of the exclusive-OR (EX-OR) type having its output connected directly to a serial input 17 of a conference actuator 18 by means of a further serial line section 16.

The other input to said logic gate 15 is connected directly to a second serial output 19 from the switching array 9 by a line 20.

A microprocessor 21 is connected by a conventional bus 22 to both said switching array 9, to control switching of messages appearing at one of the inputs 10 over to the output serial line 14, and said conference actuator 18 to control the arithmetic summing operations for the PCM codings of the messages received sequentially on the input 17.

Said conference actuator 18 comprises a serial output 23 connected directly to a serial input 24 of the switching array 9 via a third serial line 25. Addressed and transmitted on that output 23 are the sums, performed by the conference actuator 18, of the PCM codings of the messages transmitted from the participants in the conference; these sums are subsequently passed on one of the parallel outputs 12 of the array 9 under control of the microprocessor 21.

In the exemplary embodiment being discussed reference is made to a conference between an odd number of participants, in particular three, each being assigned a PCM coding of a transmitted analog phonic signal, respectively denoted A, B, and C.

On each double-wire line 3 interconnecting each of the participants in the telephone conference, the analog phonic messages are transmitted bidirectionally. For example, the reference character $S_A$ denotes the analog signal transmitted on the line 3 by a first participant in the conference, and $R_A$ the analog signal received by that participant on that same line 3.

Through the telephone fork formed by the converting circuit 4, a signal $ST_A$ is transmitted on the double-wire transmission line 6 which is converted to a digital coding of the PCM type.

The technique for digitizing the analog signals into the PCM code is quite conventional and comprises the steps of filtering the analog signal in the 300–3400 Hz band, followed by sampling at a frequency of 8000 Hz and coding the samples with an 8-bit byte. The first of these eight bits defines the polarity of the sample amplitude; thus, a logic value "0" of said first bit would represent a negative amplitude of the original message, and a logic value "1" would represent a positive amplitude of the message.

The group of three bits following the first most significant bit define a binary number of a segment to which the amplitude of the sample message belongs. The remaining four bits define a binary number related to the step to which the sample amplitude belongs within that segment.

The conversion of the messages transmitted from each participant into PCM coded messages is performed by the analog-to-digital converters 8a; the individual PCM-coded signals, denoted A, B and C, are multiplexed by multiplexer 8b in accordance with a conventional technique referred to as TDM (Time Division Multiplexing), to the line 26, to provide a time multiplexed digital signal transmitted to one of the inputs 10 of the switching array 9.

The first step of the method according to this invention consists of switching the aforesaid messages A, B and C over on the serial line 14. This operation is performed by the switching array 9 under control of the microprocessor 21. These messages, whose digital coding is shown in FIG. 2, are therefore sent sequentially to the input of the logic gate 15 of the exclusive-OR type.

The microprocessor 21 also controls the issuing, on the serial output 19 of that same array 9, of a signal 27 to reverse the PCM coding sign of a number of such messages equal to the approximation to the nearest number below the number of the participants in the conference divided by two, where the number of participants is an odd number.

The sign of a PCM message is changed by changing the most significant bit in the eight-bit byte constituting the coding.

Accordingly, by sending in parallel to the second input 28 of the logic gate 15 appropriate sequences of codings having a logic value of one for the most significant bit and the remaining seven bits in the byte at a logic value of zero, it becomes possible to have the sign of the PCM coding of some may be reversed through the exclusive-OR gate 15.

Subsequently, a first conference is effected in the conference actuator 18 by adding the inverted sign messages to the remaining original messages; the summing operation is, of course, carried out on the codings of such messages. This same conference actuator 18 will remove from each sum related to an individual participant the coding of the message from the participant him/herself. Within the branch exchange 2, the telephone line sections have limited length, which condition leads to the assumption with fair approximation, of equality of the coefficients K tied to the values of the various line impedances Z and responsible for the echo signal.

The sum of the inverted-sign messages plus the original messages, as carried out in the actuator 18, results in the echo components with opposite sign being cancelled.

The result of this sum is supplied to the serial input 24 of the switching array 9, which will switch one of the messages on outputs 12 to be input to the buffer 11b, which passes the individual PCM messages to the digital-to-analog converters 11a from which the messages are output for reception by the various subscribers. With an odd number of participants, a second conference becomes necessary because, on the receiving line of each participant, the one of said conferences must be supplied which, once deprived of the message related to that participant, comprises a number of inverted-sign messages equal to the number of the remaining original messages.

Thus, the echo components with opposite sign are cancelled.

In the instance of a telephone conference between an even number of participants being required, it will be sufficient to carry out a single conference between the codings of the inverted-sign messages and original messages.

In particular, by going through the same steps of the method as described in connection with three participants, for a conference involving four participants, it will be sufficient to have the bytes relating to two messages inverted prior to their connection in the conference and to perform one conference sum only.

Thus, with an even number of participants, there would be left only an echo contribution tied to one of such messages, since there can be no equality of the number of inverted-sign messages to that of the remaining original messages transmitted to each participant.

However, with an even number of participants it is still possible to achieve a considerable attenuation of the echo signal.

The method of this invention can solve, therefore, the technical problem, while affording the important advantage of greatly attenuating the echo signal present on a transmission line associated with telephone fork converting circuits. The echo can even be substantially cancelled in the instance of an odd number of participants in a conference.

I claim:
1. Apparatus for attenuating the echo signal in telephone fork converting circuits, particularly for telephone conferences between plural participants, comprising:
a digital switching array coupled to receive a plurality of parallel pulse code modulation signals representing a plurality of analog phone messages transmitted by said participants, and providing selected parallel pulse code modulation signals received by said array for transmission to said participants, selected series pulse code modulation signals received by said array, and sign reversal signals for selected ones of said pulse code modulation signals received by said array;
an exclusive-OR type circuit coupled to receive said selected series pulse code modulation signals provided by said array and said sign reversal signals provided by said array, said exclusive-OR type circuit receiving said selected series pulse code modulation signals and said sign reversal signals and providing series pulse code modulation signals having selected ones of said pulse code modulation signals received by said circuit inverted;
a conference actuator coupled to receive said series pulse code modulation signals provided by said exclusive-OR type circuit, adding said series pulse code modulation signals received by said conference actuator and providing the result;
said array being coupled to receive said result provided by said conference actuator; and
a microprocessor coupled to said digital switching array for causing said digital switching array to provide said selected series pulse code modulation signals and said signal reversal signals for selected pulse code modulation signals, said microprocessor also being coupled to said conference actuator for causing said conference actuator to add said received series pulse code modulation signals and providing said result.

2. The apparatus of claim 1 including analog-to-digital converter means for receiving a plurality of analog phonic messages from said participants and converting them to said parallel pulse code modulation signals, multiplexer means for multiplexing said parallel pulse code modulation signals to said switching array, and digital-to-analog converter means coupled to receive said parallel pulse code modulation signals provided by said array and converting them to analog phonic messages for transmission to said participants.

* * * * *